United States Patent [19]
Lance

[11] 3,749,506
[45] July 31, 1973

[54] COMPACTOR SUSPENSION SYSTEM
[75] Inventor: Raymond E. Lance, Fort Worth, Tex.
[73] Assignee: Construction Technology, Inc., Arlington, Tex.
[22] Filed: July 23, 1970
[21] Appl. No.: 57,452

[52] U.S. Cl. ............................................. 404/133
[51] Int. Cl. ........................................ E01c 19/30
[58] Field of Search .................. 267/136, 137, 122; 173/139, 162; 94/49, 48

[56] References Cited
UNITED STATES PATENTS

| | | | |
|---|---|---|---|
| 3,497,017 | 2/1970 | Goettl et al. | 94/49 X |
| 3,592,111 | 7/1971 | Livingston et al. | 94/49 |
| 3,552,501 | 1/1971 | Weiss | 173/139 X |
| 3,427,939 | 2/1969 | Braff | 94/48 |
| 2,903,948 | 9/1959 | Simmonds | 94/49 |
| 1,656,301 | 1/1928 | Stevens | 267/137 X |
| 2,967,739 | 1/1961 | Hoffmann | 267/122 X |
| 3,321,200 | 5/1967 | Polhemus | 267/122 X |
| 3,024,861 | 3/1962 | Clynch | 94/48 X |
| 3,498,384 | 3/1970 | Ogura | 94/48 |

Primary Examiner—Nile C. Byers, Jr.
Attorney—Richards, Harris & Hubbard

[57] ABSTRACT

A construction implement includes a vehicle having a boom, a compactor, and a compactor suspension system for supporting the compactor on the boom and for isolating the vheicle from vibrations caused by operation of the compactor. The compactor suspension system includes a frame mounted on the boom and at least one air bag mounted between the frame and the compactor. The alignment between the compactor and the boom is maintained by guide bars that extend from the frame into engagement with cooperating guide members on the compactor.

2 Claims, 3 Drawing Figures

PATENTED JUL 31 1973 3,749,506

INVENTOR
RAYMOND E. LANCE

COMPACTOR SUSPENSION SYSTEM

BACKGROUND AND SUMMARY OF THE INVENTION

This invention relates to a compactor suspension system, and more particularly to a vibration isolation suspension system for supporting compactors on backhoes, and the like.

In the construction industry, compactors are used to compress earth, sand and other relatively loose materials prior to paving or similar operations. Compactors suitable for use in construction operations typically include at least one compacting shoe, and apparatus for vibrating the compacting shoe very rapidly. It has been found that if a compactor is mounted directly on a backhoe or similar vehicle, vibrations from the compactor tend to damage the vehicle, such as by loosening hydraulic seals and fittings, disengaging connecting pins, breaking welds, etc.

The present invention comprises a compactor suspension system that isolates a compactor supporting vehicle from the vibrations caused by the operation of a compactor. In accordance with the preferred embodiment of the invention, a compactor is supported on a backhoe or similar vehicle by a fluid spring. Compactor suspension systems employing the invention are superior to prior compactor suspension systems in that for a given capacity, fluid springs are more resilient than other springs, and in that the capacity of fluid springs can be varied within limits.

DESCRIPTION OF THE DRAWING

A more complete understanding of the invention may be had by referring to the following Detailed Description when taken in conjunction with the drawing, wherein.

DETAILED DESCRIPTION

Figure 1:
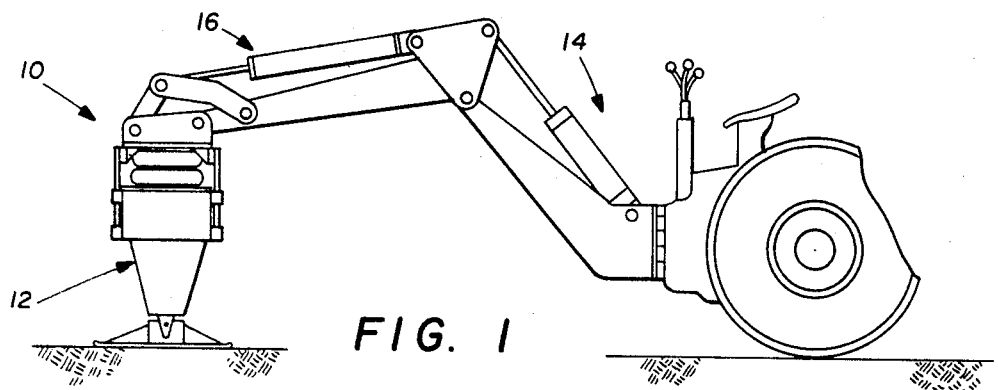
FIG. 1 is a side view of a compactor suspension system comprising a first embodiment of the invention.

Referring now to the drawing, and particularly to FIG. 1 thereof, a compactor suspension system 10 comprising the preferred embodiment of the invention is shown. The compactor suspension system 10 supports a compactor 12 on a vehicle 14, such as a conventional backhoe, or the like. The vehicle 14 includes a hydraulically operated boom 16 which is selectively operated to manipulate the compactor 12 and to apply pressure thereto. The compactor 12 may comprise any of the commercially available compactors, however, the compactor disclosed in the co-pending application of Johnston R. Livingston and George C. Whitus, Ser. No. 811,753, Filed Apr. 1, 1969, now U.S. Pat. No. 3,592,111 granted July 13, 1971, and assigned to the assignee of the present application is preferred.

Figure 2:
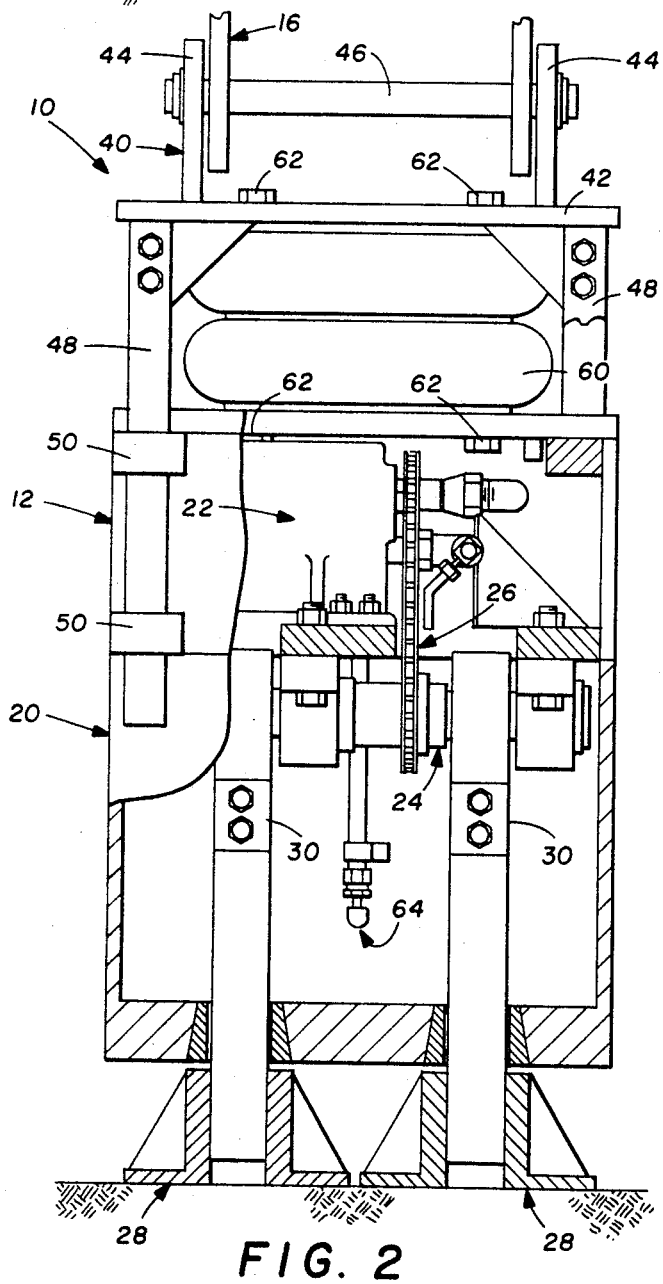
FIG. 2 is an end view of the compactor suspension system shown in FIG. 1 in which certain parts have been broken away more clearly to illustrate certain features of the invention.

Referring now to FIG. 2, the compactor 12 includes a housing 20 which supports a hydraulic motor 22. The hydraulic motor 22 rotates a shaft assembly 24 through a chain and sprocket drive 26. A pair of compacting shoes 28 are supported on the shaft assembly 24 by a pair of eccentrics 30. Thus, upon operation of the motor 22, the compacting shoes 28 are alternately reciprocated and hence vibrated relative to the housing 20 of the compactor 12. This action produces vibrations which can damage the vehicle 14 if the vehicle is not isolated therefrom.

The compactor suspension system 10 includes a frame 40 comprising a horizontally extending plate 42 and a pair of vertically extending plates 44. A pair of pins 46 extend between the vertically extending plates 44 and are received by the extremities of the hydraulically operated boom 16 of the vehicle 14. A plurality of guide bars 48 extend downwardly from the horizontally extending plate 42 of the frame 40. Each guide bar 48 is received in a pair of guides 50 mounted on the housing 20 of the compactor 12. The guides 50 cooperate with the guide bars 48 to maintain a predetermined orientation between the compactor 12 and the boom 16 of the vehicle 14.

In accordance with the preferred embodiment of the invention, the compactor 12 is secured to the frame 40 of the compactor suspension system 10 by an air bag 60. The air bag 60 is fastened to the horizontally extending plate 42 of the frame 40 and the housing 20 of the compactor 12 by a plurality of threaded fasteners 62, and is provided with an inlet port 64. The air bag 60 is preferably conventional in design, for example, the air bag 60 may comparise an air bag of the type manufactured by the Oil States Rubber Company of Arlington, Texas, Such an air bag has a dead weight capacity of approximately 5,000 pounds when inflated to a pressure of approximately 35 psi, and has a dead weight capacity of approximately 15,000 pounds when inflated to a pressure of approximately 100 psi.

In the use of the present invention, the vehicle 14 is operated to transport the compactor 12 and the hydraulically operated boom 16 is operated to manipulate the compactor 12 into engagement with material to be compacted. During this operation, the air bag 60 of the compactor suspension system 10 supports the weight of the compactor 12, and the guide bars 48 cooperate with the guides 50 to prevent misalignment between the boom 16 and the compactor 12. When the compactor 12 is properly positioned, the motor 22 is operated to vibrate the compacting shoes 28, and the boom 16 is simultaneously operated to preload the compacting shoes 28. During the operation of the compactor 12, vibrations generated within the compactor are absorbed by the air bag 60, and are thereby prevented from damaging the boom 16 and/or the vehicle 14.

Figure 3:
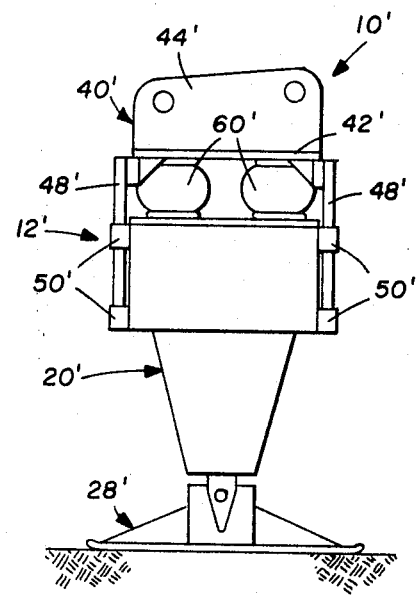
FIG. 3 is a side view of a compactor suspension system comprising a second embodiment of the invention.

Referring now to FIG. 3, a compactor suspension 10' comprising an alternative embodiment of the invention is shown. The compactor suspension system 10 is identical to the compactor suspension system illustrated in FIGS. 1 and 2 except at the frame 40' of the system 10' is secured to the housing 20' of the compactor 12' by a plurality of relatively small diameter air bags 60'. The compactor suspension system 10' functions identically to the system 10 to isolate the boom 16' and the vehicle 14' from vibrations generated by the operation of the compactor 12', and differs from the suspension system 10 principally in that the small diameter air bags 60' which support the compactor 12 having a greater deadweight capacity than the single air bag 60 of the system 10.

From the foregoing, it will be understood that the present invention comprises a compactor suspension system which supports a compactor on a vehicle and which isolates the vehicle from vibrations generated during the operation of the compactor. Compactor suspension systems employing the invention preferably comprise one or more fluid springs which function both to support a compactor and to absorb vibrations generated thereby. The use of the invention is advantageous over the prior art in that a fluid spring typically provides a relatively high vibration absorption characteristics compared with its deadweight supporting capacity, and in that the capacity of a fluid spring is adjustable.

Although specific embodiments of the invention have been illustrated in the drawing and described in the foregoing, it will be understood that the invention is not limited to the embodiments disclosed, but is capable of rearrangement, modification and substitution of parts and elements without departing from the spirit of the invention.

What is claimed is:

1. A construction implement comprising:
   a compactor mechanism including a housing, dual striking members supported for reciprocation relative to the housing, a motor mounted on the housing, and means driven by the motor for effecting alternate reciprocation of the striking members;
   a vehicle for transporting the compactor mechanism and coupled to the motor for supplying operating power thereto;
   an articulated boom extending from the vehicle for manipulating the compactor mechanism both horizontally and vertically and for applying a force to the compactor mechanism during the operation thereof;
   a frame connected to the distal end of the boom;
   at least one air bag mounted between the frame and the housing of the compactor mechanism and comprising the sole supportive connection between the boom and the compactor mechanism so that the boom operates through the air bag to position the compactor mechanism horizontally and vertically and so that the force of the boom is applied to the compactor mechanism through the air bag; and
   cooperating guide means on the frame and the housing of the compactor mechanism for maintaining a predetermined alignment therebetween.

2. The construction implement according to claim 1 wherein the cooperating guide means comprises a plurality of guide members extending between the frame and the housing of the compactor mechanism and structure for slidably receiving the guide members and thereby maintaining the predetermined alignment between the frame and the housing.

* * * * *